United States Patent [19]
Amo et al.

[11] Patent Number: 5,980,677
[45] Date of Patent: Nov. 9, 1999

[54] METHOD OF LAMINATING DISC SUBSTRATES

[75] Inventors: Mikuni Amo; Youichi Nakagawa, both of Tokushima-ken, Japan

[73] Assignee: Kitano Engineering Co., Ltd., Tokushima-ken, Japan

[21] Appl. No.: 09/014,509

[22] Filed: Jan. 28, 1998

[30] Foreign Application Priority Data

Jan. 28, 1997 [JP] Japan ................................ 9-029794

[51] Int. Cl.⁶ .......................... B44C 1/165; B32B 31/00; B32B 9/00; B32B 3/02
[52] U.S. Cl. ........................ 156/230; 156/230; 156/235; 156/238; 156/240; 156/247; 156/250; 156/289; 428/40.1; 428/64.1; 428/65.2
[58] Field of Search ..................... 156/230, 231, 156/234, 235, 238, 239, 240, 241, 247, 250, 289, 361, 584; 428/64.1, 40.1, 65.2

[56] References Cited

U.S. PATENT DOCUMENTS

| | | | |
|---|---|---|---|
| 2,810,976 | 10/1957 | Scott | 41/1 |
| 4,481,067 | 11/1984 | Off et al. | 156/541 |
| 4,861,411 | 8/1989 | Tezuka | 156/344 |
| 4,939,011 | 7/1990 | Takahashi et al. | 428/68 |
| 5,146,438 | 9/1992 | Harper | 369/13 |
| 5,254,201 | 10/1993 | Konda et al. | 156/344 |
| 5,470,420 | 11/1995 | Yokajty | 156/566 |
| 5,600,359 | 2/1997 | Kikuchi | 347/171 |
| 5,656,125 | 8/1997 | Tanaka | 156/361 |
| 5,810,962 | 9/1998 | Annenkov et al. | 156/344 |

*Primary Examiner*—Richard Crispino
*Assistant Examiner*—J. A. Lorengo
*Attorney, Agent, or Firm*—Flynn, Thiel, Boutell & Tanis, P.C.

[57] ABSTRACT

A method of laminating disc-shaped substrates which is capable of automatically bonding an adhesive agent to the disc-shaped substrates very effectively and continuously. The method of laminating disc-shaped substrates includes the steps of preparing an adhesive sheet body comprising a plurality of adhesive agents each covered with a release paper and bonded to the adhesive sheet body, peeling off the release paper from the adhesive agent, positioning each adhesive agent over a lower disc-shaped substrate, pressing the adhesive sheet body to bond the adhesive agent to the lower disc-shaped substrate, peeling off the adhesive sheet body from the lower disc-shaped substrate, placing an upper disc-shaped substrate on the lower disc-shaped substrate, and pressing the upper disc-shaped substrate against the lower disc-shaped substrate to integrally laminate the disc-shaped substrates.

9 Claims, 10 Drawing Sheets

F I G. 12
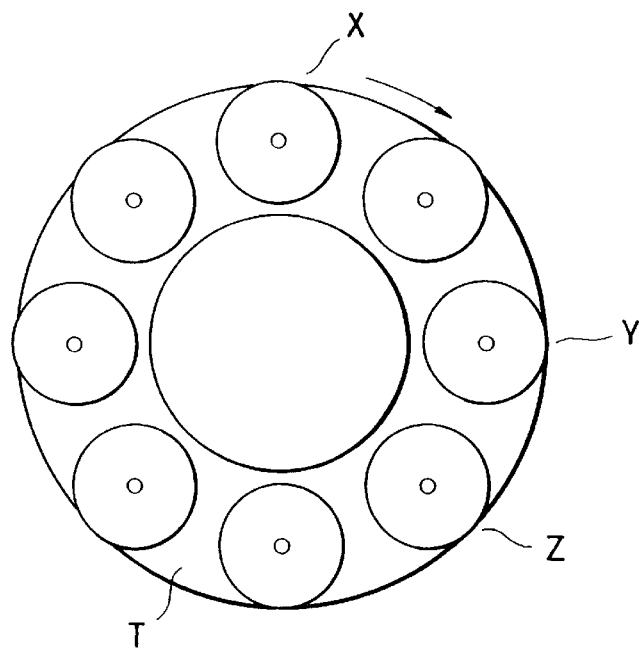
F I G. 14 (A)
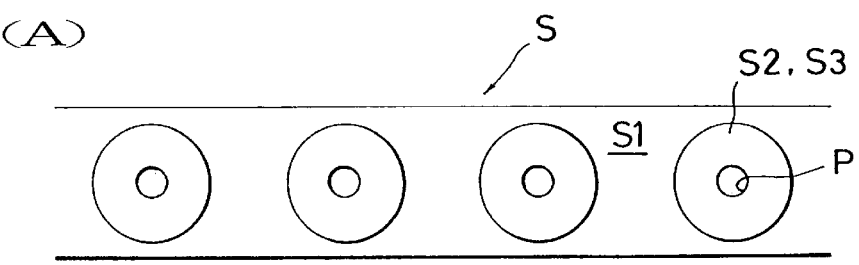
F I G. 14 (B)
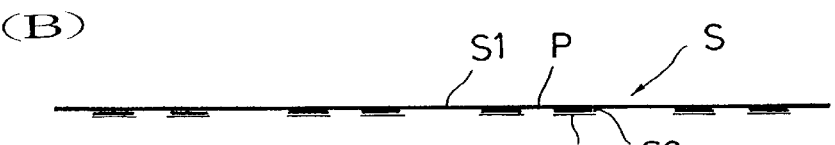
F I G. 14 (C)
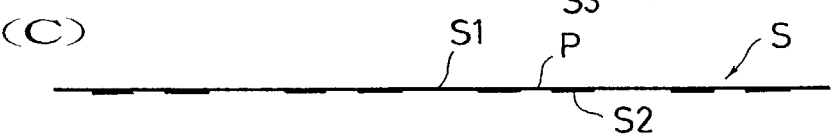
F I G. 15 (A)
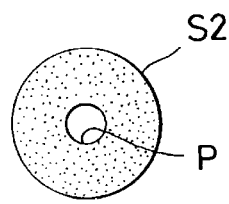
F I G. 15 (B)
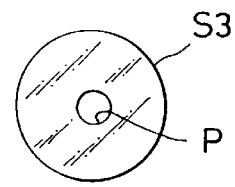

F I G. 19

STEP 1 — PREPARING AN ADHESIVE SHEET BODY COMPRISING A PLURALITY OF ADHESIVE AGENTS EACH COVERED WITH A RELEASE PAPER AND BONDED TO A CARRIER

⇩

STEP 2 — PEELING OFF THE RELEASE PAPER FROM THE ADHESIVE AGENT

⇩

STEP 3 — POSITIONING EACH ADHESIVE AGENT OVER A LOWER DISC-SHAPED SUBSTRATE

⇩

STEP 4 — PRESSING THE ADHESIVE SHEET BODY TO BOND THE ADHESIVE AGENT TO THE LOWER DISC-SHAPED SUBSTRATE

⇩

STEP 5 — PEELING OFF THE CARRIER FROM THE ADHESIVE AGENT BONDED TO THE LOWER DISC-SHAPED SUBSTRATE

⇩

STEP 6 — PLACING AN UPPER DISC-SHAPED SUBSTRATE ON THE LOWER DISC-SHAPED SUBSTRATE

⇩

STEP 7 — PRESSING THE UPPER DISC-SHAPED SUBSTRATE AGAINST THE LOWER DISC-SHAPED SUBSTRATE TO INTEGRALLY LAMINATE THE DISC-SHAPED SUBSTRATES

FIG. 20
PRIOR ART
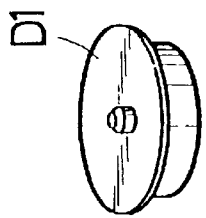
STEP (5)
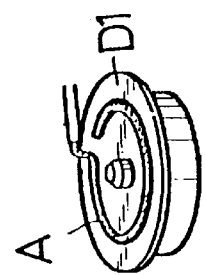
STEP (4)
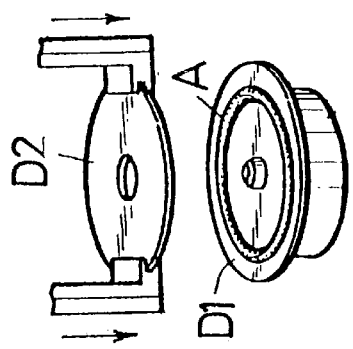
STEP (3)
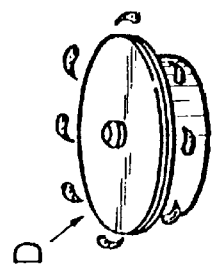
STEP (2)
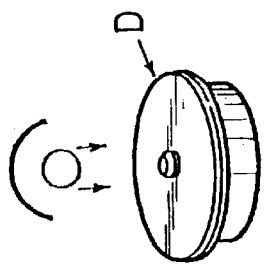
STEP (1)

METHOD OF LAMINATING DISC SUBSTRATES

BACKGROUND OF THE INVENTION

1. Field of the Invention

The present invention relates to a method of laminating disc-shaped substrates, particularly to a method of integrally laminating two substrates using an adhesive sheet.

2. Prior Art

Computers, especially personal computers have become remarkably popular recently, and the kinds of storage media to be used thereby and the capacity of such storage media, particularly storage discs has increased. There are a magnetic disc, an optical disc (e.g., CD-ROM), an optical magnetic disc (e.g., MO), etc. as the storage disc. The demand for the optical discs as storage discs has increased recently.

Exemplifying an optical disc called a DVD, a disc-shaped substrate that is a single plate constituting the DVD is required to have a thickness of 0.6 mm and an outer diameter of 120 mm and an inner diameter of its central hole of 15 mm. Since such a thin disc-shaped substrate formed of a single plate is low in mechanical strength and is easily deformable, and in view of storage capacity, the disc-shaped substrates each having the same thickness (0.6 mm) are bonded to each other to form an integrated substrate in a practical use thereof.

Such a high density storage disc including a DVD is generally used as a laminated structure as set forth above, but not used as a single plate. In such a case, the upper and lower disc-shaped substrates must to be bonded to each other.

A series of the following processes or steps have been taken to manufacture an integrated storage disc (e.g. optical disc) by bonding two substrates (see FIG. 20).

(1) a step of placing a lower disc-shaped substrate D1 on a holding table.

(2) a step of coating an adhesive agent A made of UV cured resin to the lower disc-shaped substrate D1.

(3) a step of placing an upper disc-shaped substrate D2 on the lower disc-shaped substrate D1 to overlay the former on the latter.

(4) a step of rotating the holding table to develop the adhesive agent A interposed between the disc-shaped substrates D1 and D2 on the entire surfaces thereof.

(5) a step of irradiating the developed adhesive agent A made of UV cured resin with UV to cure the adhesive agent A.

The storage disc is manufactured by the aforementioned steps, namely, the two disc-shaped substrates D1 and D2 are bonded to each other to form a single integrated plate.

However in such a bonding method, since the adhesive agent A is developed in a wider range by rotating the holding table, the adhesive agent A sprays outwardly due to by centrifugal force. The periphery of the storage disc is made dirty or soiled by the spray of the adhesive agent A or the adhesive agent A is scattered and lost and hence a significant amount of the adhesive agent A is wasted.

Further, there is a problem that the thickness of the adhesive layer is not at all uniform. Still further, there is another problem that the number of manufacturing steps increases which increases the manufacturing cost because of the necessity of the step of irradiating adhesive agent with UV to cure the adhesive agent.

Accordingly, there is a need for a method of bonding two substrates using an adhesive agent without requiring the developing step of the adhesive agent as set forth above. In the bonding method using an adhesive agent, the adhesive agent is bonded to one of two disc-shaped substrates to be bonded, and thereafter the one disc-shaped substrate is overlaid on the other disc-shaped substrate.

An adhesive agent is generally used in a state where it is bonded to a sheeting, i.e. adhesive sheet body forming a base member, wherein a plurality of adhesive sheets to which the adhesive agent is bonded are bonded to the adhesive sheet body S. Accordingly, it is very ineffective to peel off the adhesive agent on the adhesive sheet one by one manually to bond or transfer it to the lower disc-shaped substrate when two disc-shaped substrates are bonded to each other. Further, bonding operation of an adhesive agent need be automated to incorporate the bonding operation of the adhesive agent to the disc-shaped substrates into the laminating lines of the disc-shaped substrates so as to produce a series of laminating lines which are sequentially controlled as a whole. That is, it is necessary to automatically bond the adhesive agent to the disc-shaped substrate to produce continuous laminating lines.

SUMMARY OF THE INVENTION

The present invention has been made to solve the aforementioned problems. That is, it is an object of the invention to provide a method of laminating disc-shaped substrates capable of automatically bonding an adhesive agent to the disc-shaped substrates very effectively and continuously.

The inventors of the present application endeavored themselves to study the aforementioned problems and have found that release paper is peeled off from an adhesive agent bonded to an adhesive sheet body and the exposed adhesive agent is bonded to the lower disc-shaped substrate so as to sequentially band the adhesive agent to the lower disc-shaped substrate D1, and thereafter the invention was completed.

A method of laminating disc-shaped substrates according to a first aspect of the invention comprises preparing an adhesive sheeting (hereinafter referred to as adhesive sheet body) S comprising a plurality of adhesive sheets (hereinafter referred to as adhesive agents) S2 each covered with a release paper S3 and bonded to the adhesive sheet body S, peeling off the release paper S3 from the adhesive agent S2, pressing the exposed adhesive agent S2 from which the release paper S3 is peeled off against a surface of a lower disc-shaped substrate D1 so as to bond or transfer the adhesive agent S2 provided on the adhesive sheet body, peeling off the adhesive sheet body from the adhesive agent S2 bonded to the upper surface of the lower disc-shaped substrate D1, placing an upper disc-shaped substrate D2 on the lower disc-shaped substrate D1 by pressing the upper disc-shaped substrate D2 against the lower disc-shaped substrate D1, thereby bonding two lower disc-shaped substrate D1 and upper disc-shaped substrate D2.

A method of laminating disc-shaped substrates according to a second aspect of the invention comprises the following steps 1 to 7.

1) a step of preparing an adhesive sheet body S comprising a plurality of adhesive agents S2 each covered with release paper S3 and bonded to the adhesive sheet body S;

2) a step of peeling off the release paper S3 from the adhesive agent S2;

3) a step of positioning each adhesive agent S2 over a lower disc-shaped substrate D1;

4) a step of pressing the adhesive sheet body S to bond the adhesive agent to the lower disc-shaped substrate D1;

5) a step of peeling off the adhesive agent 82 bonded to the lower disc-shaped substrate D1 from the release paper S3;

6) a step of placing an upper disc-shaped substrate D2 on the lower disc-shaped substrate D1; and 7) a step of pressing the upper disc-shaped substrate D2 against the lower disc-shaped substrate D1 to integrally laminate the disc-shaped substrates D1 and D2.

The method of laminating disc-shaped substrates according to a third aspect of the invention further includes a step of collecting the release paper S3 in the second aspect of the invention.

The method of laminating disc-shaped substrates according to a fourth aspect of the invention includes the step of collecting the release paper S3 using an adhesive tape having an adhesion force relative to the release paper S3 which is greater than that of the adhesive agent S2 relative to the release paper S3.

The method of laminating disc-shaped substrates according to a fifth aspect of the invention includes pressing the adhesive sheet body S against the lower disc-shaped substrate D1 from a central portion to an outer portion thereof to enlarge a contact portion so as to bond the adhesive agent S2 to the lower disc-shaped substrate D1.

The method of laminating disc-shaped substrates according to a sixth aspect of the invention includes peeling off the adhesive agent 82 from the adhesive sheet body S, namely, carrier S1 by a peeling member which traverses between the adhesive sheet body S and the lower disc-shaped substrate D1 placed on the holding table 2.

The method of laminating disc-shaped substrates according to an seventh aspect of the invention comprises peeling off the adhesive sheet body S from the adhesive agent S2 in a state where the adhesive sheet body S is relaxed.

The method of laminating disc-shaped substrates according to an eighth aspect of the invention comprises tightening the adhesive sheet body S immediately after the adhesive sheet body S is peeled off from the adhesive agent S2.

The method of laminating disc-shaped substrates according to a ninth aspect of the invention comprises pressing the upper disc-shaped substrate D2 against the lower disc-shaped substrate D1 from a central portion to an outer portion thereof to enlarge a contact portion so as to bond the adhesive agent S2 to the lower disc-shaped substrate D1.

With the employment of the methods of laminating disc-shaped substrates according to the first to the ninth aspects of the invention, the adhesive agent can be continuously and automatically bonded to the lower disc-shaped substrate thereby making it possible to effectively bond the disc-shaped substrates.

BRIEF DESCRIPTION OF THE DRAWINGS

FIG. 13 is a view showing a position of each station;

FIG. 14(A) is a front view showing an adhesive sheet body,

FIG. 14(B) is a side view thereof and

FIG. 14(C) is a side view of the adhesive sheet body from which the release paper is peeled off;

FIG. 15(A) is a view showing a shape of an adhesive agent,

FIG. 15(B) shows a shape of release paper;

FIG. 19 is a block diagram showing steps in the method of laminating disc-shaped substrates according to the present invention;

FIG. 20 is a schematic view showing a conventional method of laminating disc-shaped substrates using an adhesive agent.

PREFERRED EMBODIMENT OF THE INVENTION

A method of laminating disc-shaped substrates according to the present invention will be now described with reference to FIGS. 1 to 9 showing the steps for bonding an adhesive agent S2 to a lower disc-shaped substrate D1.

Before explaining the above with reference to FIGS. 1 to 9, an adhesive sheet body S, which is prepared for performing the present invention, is explained. The adhesive sheet body S comprises a carrier S1 formed of a long base, adhesive agent S2 which is bonded to the carrier S1 and formed of synthetic resin tape such as thin polyethylene and release paper S3 temporarily bonded to the surface of the adhesive agent S2 (See FIG. 1).

FIG. 14(A) shows a front view of the adhesive sheet body S, FIG. 14(B) is a side view of the adhesive sheet body S and FIG. 14(C) is a side view showing a state where the release paper S3 has been peeled off of the adhesive agent S2.

The adhesive agent S2 forms a fixed medium for integrally laminating the disc-shaped substrates D1 and D2 as described below, and comprises a plurality of LP (long-playing record)-shaped sheets (See FIG. 15(A)) each bonded to the surface of the carrier S1 at regular intervals. There is employed a pressure sensitive adhesive agent as the adhesive agent S2 such as rubber-based adhesive agent, acrylic adhesive agent, silicon adhesive agent, vinyl adhesive agent and polyethylene adhesive agent. It is possible to select the optimum thickness of the adhesive agent S2 depending on the kind of storage disc to be designed.

The release paper S3 is temporarily bonded to the adhesive agent S2 to cover the adhesive agent S2 and has the same shape as that of the adhesive agent S2 (See FIG. 15(B)).

The adhesive sheet body S has many holes P each penetrating the carrier S1, adhesive agent S2 and the release paper S3 at the same time when it is manufactured. Each hole P is utilized for positioning the adhesive agent S2 relative to the holding table 2. The release paper S3 is peeled off from the adhesive agent S2 prior to the adhesive sheet body S being supplied between a pressing body 1 and the holding table 2.

The adhesive agent S2 is bonded to the lower disc-shaped substrate D1 in the following manner.

Figure 1:
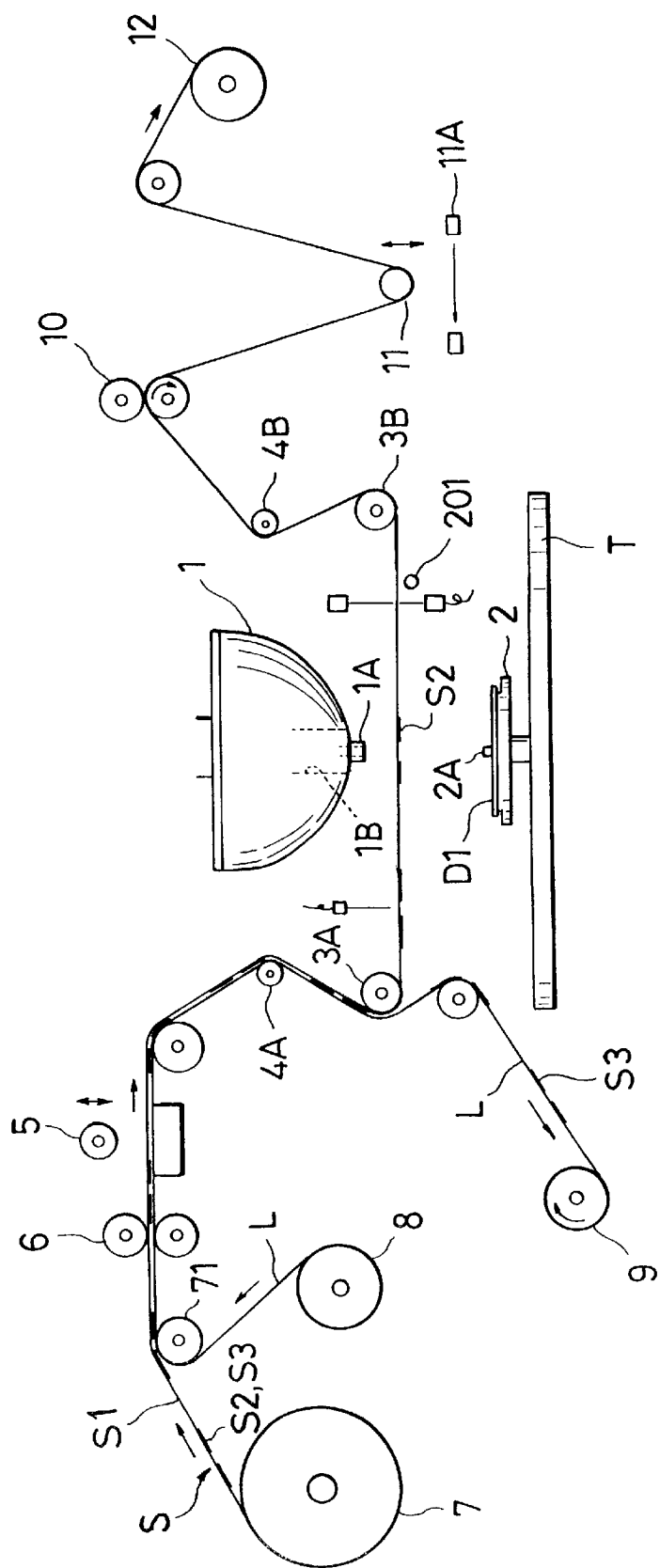
FIG. 1 is a view showing an initial pressing state of an adhesive sheet body S between a pressing body and a substrate.

FIG. 1 shows a method of bonding the adhesive agent S2 wherein the adhesive sheet body S is released and unwound from a first supply roller 7. Bonded matter such as dust is removed from the adhesive sheet body S by a cleaning roller 6 after the adhesive sheet body S unwound from the first supply roller 7. Thereafter, the adhesive sheet body S passes through a stop roller 5, then it is supplied to a first tension roller 4A and a first expansion roller 3A. The stop roller 5 presses the adhesive sheet body S against a lower table to hold the adhesive sheet body S at the upper and lower portions thereof, and it can stop the movement of the adhesive sheet body S when needed.

The adhesive sheet body S which passed through the first expansion roller 3A is supplied between the holding table 2 and the pressing body 1. The adhesive sheet body S receives a pressing force between the holding table 2 and pressing body 1 so as to bond the adhesive agent S2 to the surface of the lower disc-shaped substrate D1 which is placed on the holding table 2, described later. After the adhesive agent S2 is bonded to the surface of the lower disc-shaped substrate D1, the adhesive sheet body S passes through a second expansion roller 3B and second tension roller 4B, then it is supplied to a feed roller 10.

The feed roller 10 is positively driven to cooperate with the stop roller 5 so as to move the adhesive sheet body S when necessary.

The adhesive sheet body S fed from the feed roller 10 is wound by a second winding roller 12 through a hanging roller 11. The hanging roller 11 is hung from the adhesive sheet body S and it lowers when the adhesive sheet body S is fed from the feed roller 10. A detector 11a detects the lowering of the hanging roller 11, and issues a detection signal. The second winding roller 12 is rotated upon receipt of the detection signal from the detector 11a so as to wind the adhesive sheet body S. During the movement of the adhesive sheet body S as set forth above, the adhesive agent S2 is bonded to the lower disc-shaped substrate D1.

Meanwhile, the adhesive sheet body S is supplied between the holding table 2 and pressing body 1 in a state where the release paper S3 is removed from the adhesive agent S2, namely in a state where the adhesive face of the adhesive agent S2 is exposed. An adhesive tape L is used as means for removing or peeling off the release paper S3 from the adhesive agent S2 bonded on the adhesive sheet body S. That is, as illustrated in the drawings, the adhesive sheet body S unwound from the first supply roller 7 has the adhesive agent S2 bonded on the carrier S1, and the release paper S3 is bonded to the adhesive face of the adhesive agent S2.

The adhesive tape L which is supplied from a second supply roller 8 has an adhesive face at the back side, and the adhesive face of the adhesive tape L opposes the release paper S3 of the adhesive sheet body S and they contact each other at a guide roller 71. The adhesive tape L and the adhesive sheet body S respectively pass through the guide roller 71, cleaning roller 6, stop roller 5, first tension roller 4A and first expansion roller 3A and bonded to each other. As a result, the adhesive face of the adhesive tape L is bonded to the release paper S3 of the adhesive sheet body S.

After the adhesive sheet body S passes through the first expansion roller 3A, the release paper S3 is peeled off from the adhesive agent S2 of the adhesive sheet body S owing to adhesion of the adhesive tape L. When the adhesive tape L receives the release paper S3, it is wound by a first winding roller 9 so that the release paper S3 is collected. The reason why the release paper S3 is collected when it is separated from the adhesive sheet body S using the adhesive tape L is caused by the difference of adhesion, namely, the adhesion of the adhesive tape L relative to the release paper 83 is larger than that of the adhesive agent S2 relative to the release paper S3. That is, the adhesive tape L must to have adhesion relative to the release paper S3 which is greater than the adhesion of the release paper S3 relative to the adhesive agent S2.

In such a manner, the adhesive face of the adhesive agent S2 is exposed when the adhesive sheet body S is supplied between the holding table 2 and pressing body 1 from the first expansion roller 3A.

The method of laminating disc-shaped substrates will be now described with reference to the attached drawings.

The adhesive sheet body S which passes through the first tension roller 4A is supported between the first and second expansion rollers 3A and 3B which are respectively disposed at the front and rear of the holding table 2 and pressing body 1 in a state where the adhesive face of the LP-shaped adhesive agent S2 is exposed. A predetermined tension is provided to the adhesive sheet body S, (which adhesive sheet body is supported by the first and second expansion rollers 3A and 3B), by the first and second tension rollers 4A and 4B respectively disposed adjacent to the first and second expansion rollers 3A and 3B, and hence the adhesive sheet body S is held in the tensioned state (initial state).

FIG. 1 shows the initial pressing state where the adhesive sheet body S is positioned substantially in the middle between the pressing body 1 and holding table 2. Thereafter, the stop roller 5 lowers so that the adhesive sheet body S is held in a stopped position.

Figure 2:
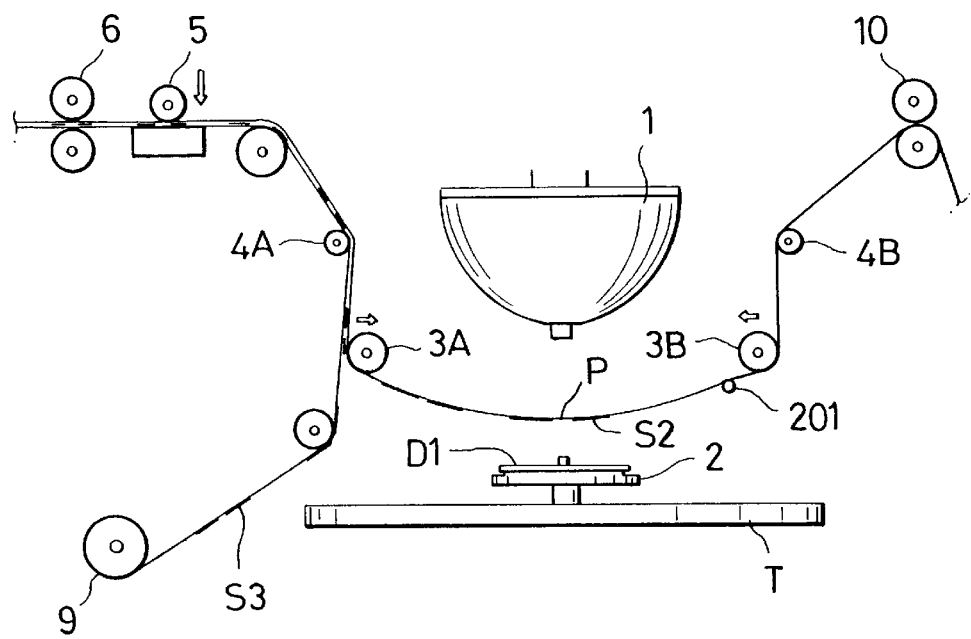
FIG. 2 is a view showing a relaxed state of the adhesive sheet body S.

Next, as shown in FIG. 2, the distance between the first and second expansion rollers 3A and 3B is reduced so that the adhesive sheet body S is held in a given relaxed state. The reason why the adhesive sheet body S is held in the relaxed state is to secure the accurate positioning of the adhesive agent S2 by the pressing body 1.

Figure 3:
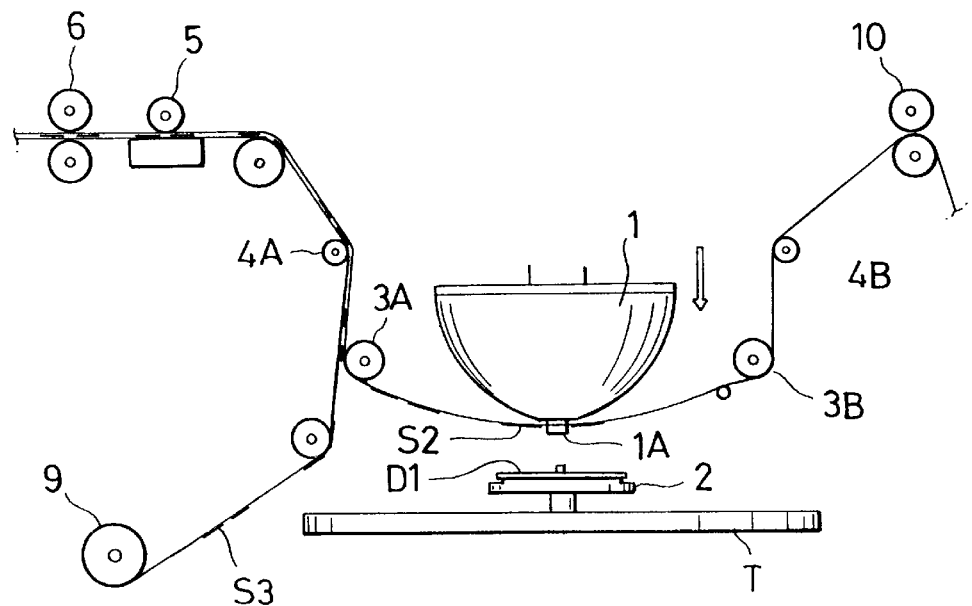
FIG. 3 is a view showing a positioning of an adhesive agent S2 relative to the substrate.

Subsequently, as shown in FIG. 3, the pressing body 1 lowers so that the positioning of the adhesive sheet body S, namely, the adhesive agent S2 relative to the lower disc-shaped substrate D1 is performed by a projecting core 1A provided at the center of the pressing body 1.

More specifically, when the pressing body 1 lowers, the lower end of the projecting core 1A projecting from the tip end of the pressing body 1 is inserted into the hole P of the adhesive sheet body S. At this time, since the adhesive sheet body S per se is not tensioned but relaxed, there occurs a slight degree of freedom in the motion of the adhesive sheet body S so that the projecting core 1A is easily inserted into the hole P of the adhesive sheet body S. Accordingly, the adhesive agent S2 of the adhesive sheet body S is accurately positioned immediately over the lower disc-shaped substrate D1.

Figure 4:
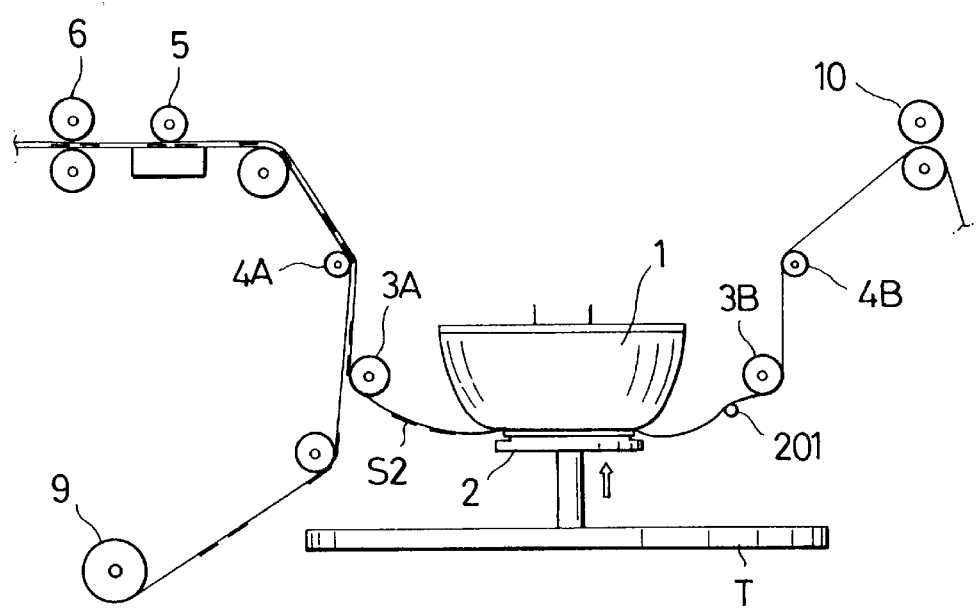
FIG. 4 is a view showing a pressing state of the adhesive agent S2.

Subsequently, the holding table 2 moves upward as shown in FIG. 4. When the holding table 2 moves upward, it gradually presses the lower surface of the flexible and hemispherical pressing body 1 from the bottom to the top so as to deform the lower half part of the pressing body 1 in a flat manner. The adhesive sheet body S positioned between the holding table 2 and pressing body 1 is pressed against the pressing body 1 by this operation. At this time, the pressing body 1 gradually presses the adhesive sheet body S radially, from the central portion to the outer portion so that the contact portion therebetween expands.

With such a specific pressing manner, the adhesive agent S2 bonded to the lower surface of the adhesive sheet body S is bonded or transferred to the surface of the lower disc-shaped substrate D1 in a state where air bubbles, etc., do not mix therein or no wrinkling is generated therein.

Figure 10:
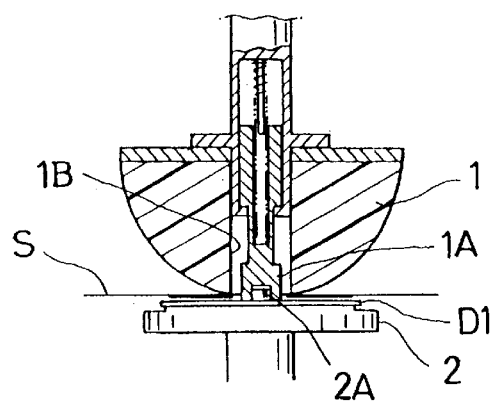
FIG. 10(A) is a side view showing an initial pressing state.
FIG. 10(B) is a plan view showing a contact portion between an adhesive sheet body and the lower disc-shaped substrate.
Figure 10:
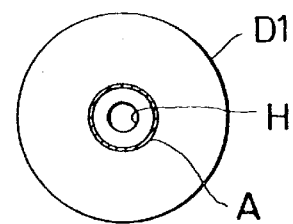
Figure 11:
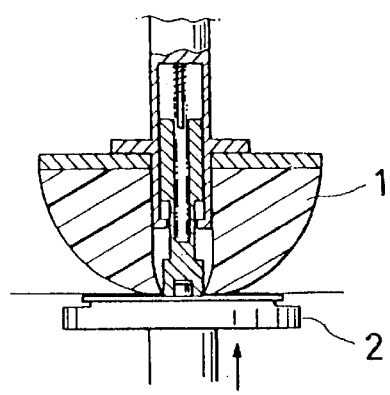
FIG. 11(A) is a side view showing a middle pressing state.
FIG. 11(B) is a plan view showing the contact portion between the adhesive sheet body and the lower disc-shaped substrate.
Figure 11:
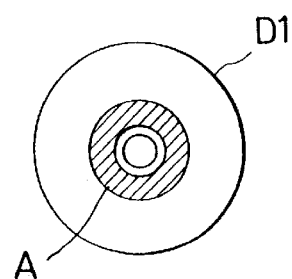
Figure 12:
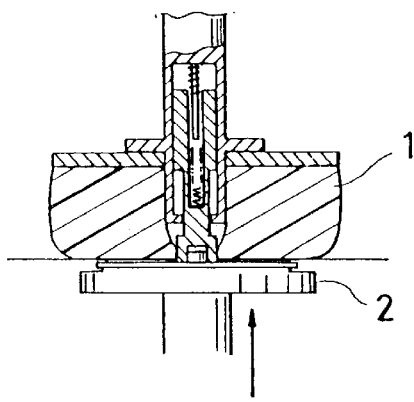
FIG. 12(A) is a side view showing a final pressing state.
FIG. 12(B) is a plan view showing the contact portion between the adhesive sheet body and the lower disc-shaped substrate.
Figure 12:
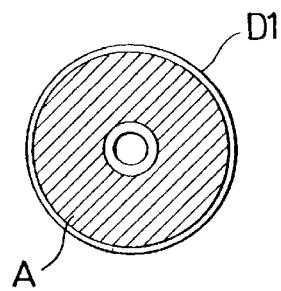

This is described more in detail with reference to FIGS. 10 to 12.

Since the pressing body 1 is a hemispherical and flexible member as set forth above, it can be easily deformed when it is pressed. The tip end of the projecting core 1A disposed at a central hole 1B (FIG. 1) of the pressing body 1 slightly projects from the tip end of the pressing body 1 and hence it can be recessed when the pressing body 1 is pressed.

The pressing state of the pressing body 1 relative to the holding table 2 when the holding table 2 moves upward relative to the pressing body 1 to press the pressing body 1 is as follows.

(1) FIG. 10(A) shows a state where the tip end of the pressing body 1 slightly contacts the lower disc-shaped substrate D1 (initial pressing state). A contact region A forms a thin annular shape as shown in FIG. 10(B).

(2) If the holding table 2 moves upward from the state of FIG. 10(A) to the state shown in FIG. 11(A) to press the pressing body 1, the lower portion of the pressing body 1 is deformed and made flat. In this state (middle pressing state), the contact region A between the pressing body 1 and the lower disc-shaped substrate D1 forms a thick annular shape (donut shape) as shown in FIG. 11(B).

(3) If the holding table 2 moves further upward from the state of FIG. 11(A) to the state shown in FIG. 12(A) to press the pressing body 1, the lower half portion of the pressing body 1 is largely deformed and made flat. In this state (final pressing state), the contact region A between the pressing body 1 and the lower disc-shaped substrate D1 forms an LP-shaped wide area as shown in FIG. 12(B).

The contact area of the pressing body 1 relative to the lower disc-shaped substrate D1 increases so as to make the contact portion therebetween increase from a central portion to an outer portion thereof in the order of FIGS. 10(A)(B) →FIGS. 11(A)(B)→FIGS. 12(A)(B). With such an operation or interaction between the pressing body 1 and holding table 2, the adhesive sheet body S interposed between the pressing body 1 and holding table 2 receives the same pressing operation. That is, the adhesive agent S2 is gradually bonded to the lower disc-shaped substrate D1 from the central portion to the outer portion (radially) so as to enlarge the bonding area. Accordingly, air bubbles and the like do not enter between the adhesive agent S2 and lower disc-shaped substrate D1, and wrinkling is not generated therebetween. As a result, the adhesive agent S2 is uniformly bonded to the surface of the lower disc-shaped substrate D1.

Returning back to FIG. 5, the pressing body 1 moves upward and returns to the original position. In this state, the bonding of the adhesive sheet body S relative to the lower disc-shaped substrate D1 is complete. That is, the adhesive agent S2 is bonded to both the adhesive sheet body S and the lower disc-shaped substrate D1. More specifically, the adhesive agent S2 is bonded to both surfaces of the carrier S1 of the adhesive sheet body S and the front or upper surface of the lower disc-shaped substrate D1.

Figure 5:
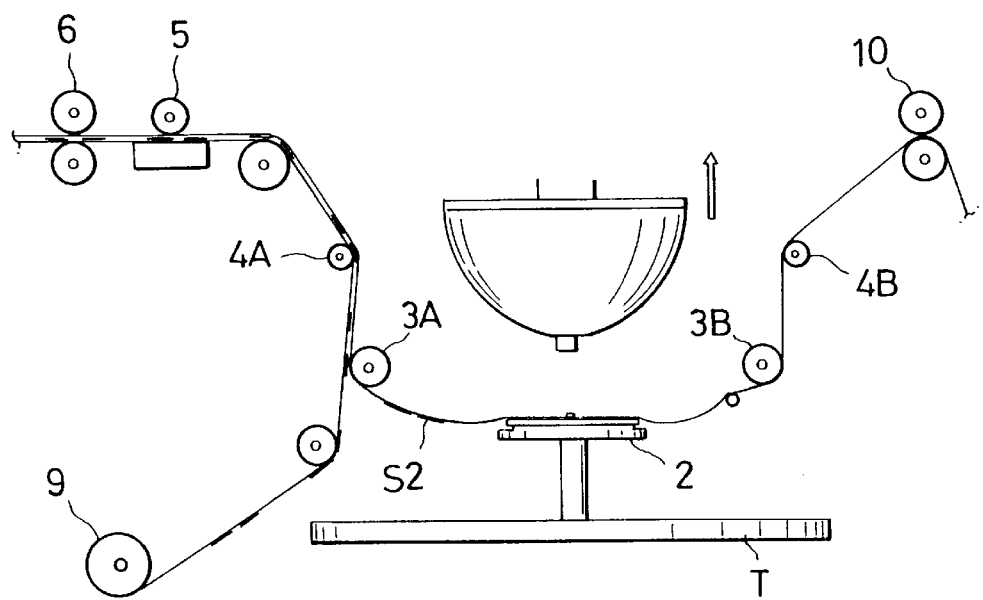
FIG. 5 is a view showing a state which is released from the pressing state in FIG. 4.
Figure 6:
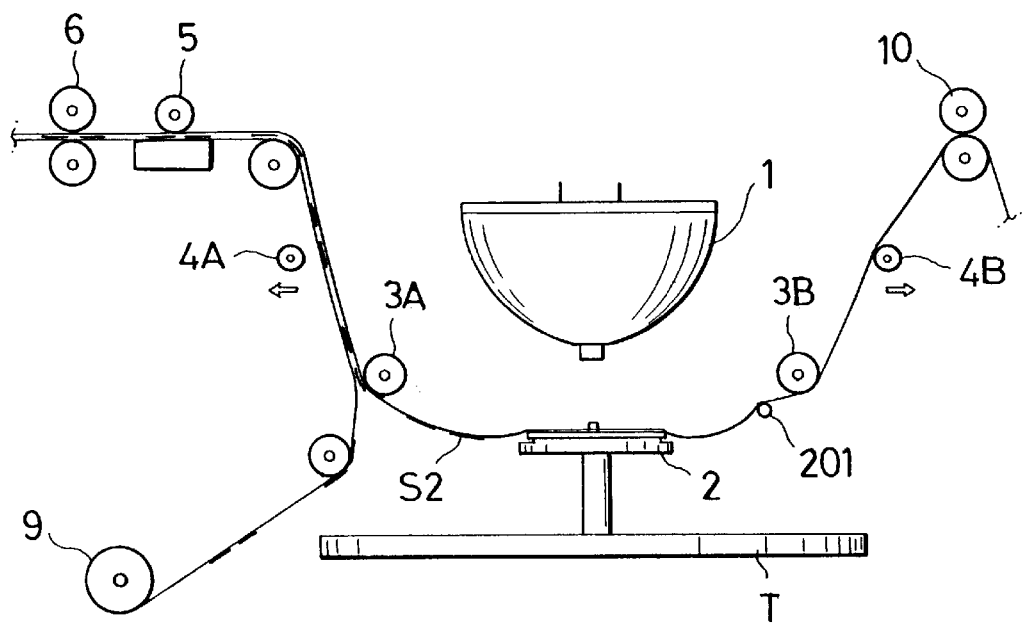
FIG. 6 is a view showing a relaxed state after the pressing state.

Subsequently, the adhesive sheet body S interposed between the first and second expansion rollers 3A and 3B is further held in a relaxed state as shown in FIG. 6 compared with the previous case (i.e. the state shown in FIG. 5). To produce this relaxed state, first and second tension rollers 4A and 4B disposed at the front and rear of the first and second expansion rollers 3A and 3B are released from the the adhesive sheet body S.

Figure 7:
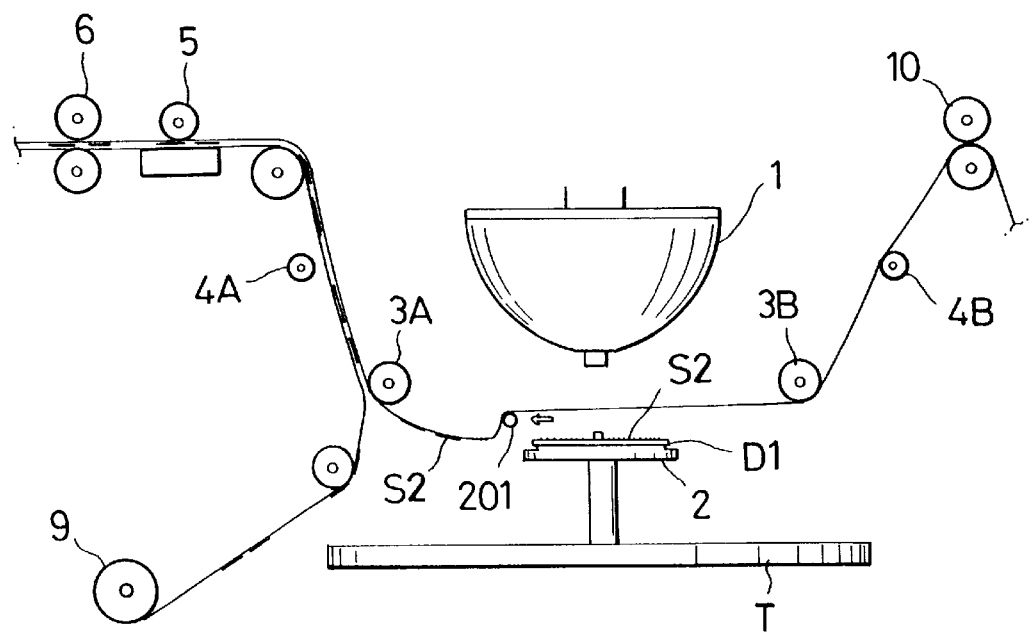
FIG. 7 is a view showing the operation of peeling off the adhesive agent S2 from the adhesive sheet body S.

Thereafter, as shown in FIG. 7, a peeling roller 201 serving as a peeling member moves to traverse between the adhesive sheet body S and the lower disc-shaped substrate D1 placed on the holding table 2. With the movement of the peeling roller 201, the carrier S1 is peeled off from the adhesive agent S2, since the adhesion of the adhesive agent S2 relative to the surface of the lower disc-shaped substrate D1 is larger than that of the adhesive agent S2 relative to the carrier S1. As a result, the adhesive sheet body S is peeled off from the lower disc-shaped substrate D1 and freed therefrom.

Figure 8:
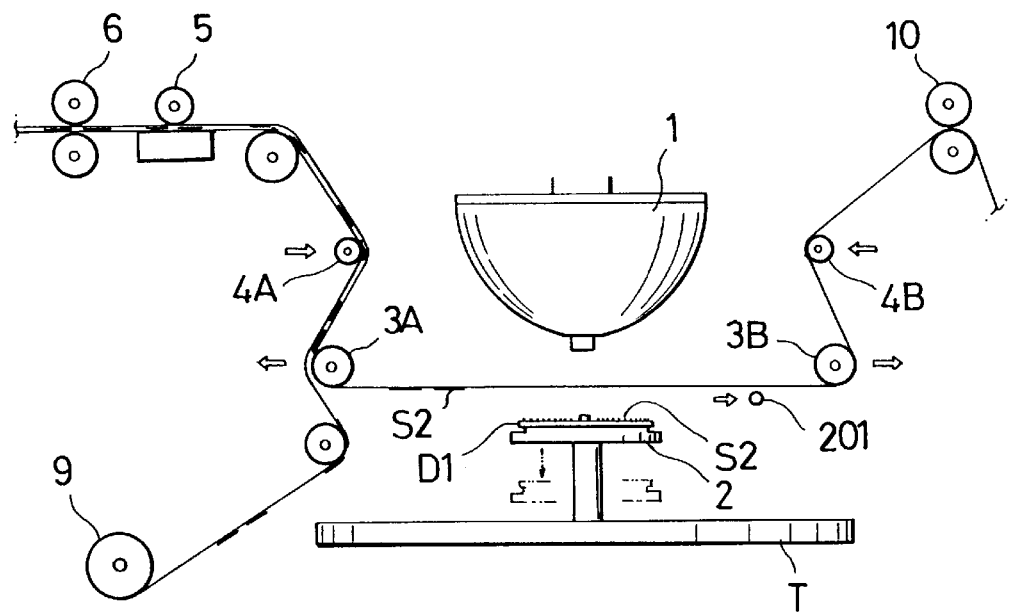
FIG. 8 is a view showing a tightening state after the operation in FIG. 7.

Next, as shown in FIG. 8, immediately after the peeling roller 201 completes the separation of the adhesive sheet body S from the lower disc-shaped substrate D1, the distance between the first and second expansion rollers 3A and 3B increases to return the adhesive sheet body S to a tensioned state.

At this time, both the first and second tension rollers 4A and 4B move inwardly to assist in tightening the adhesive sheet body S. In such a manner, since the adhesive sheet body S is held in a tensioned state immediately after the adhesive sheet body S is peeled off of the lower disc-shaped substrate D1, the adhesive sheet body S, namely, the carrier S1 does not bond again with the adhesive agent S2 bonded on the lower disc-shaped substrate D1.

Figure 9:
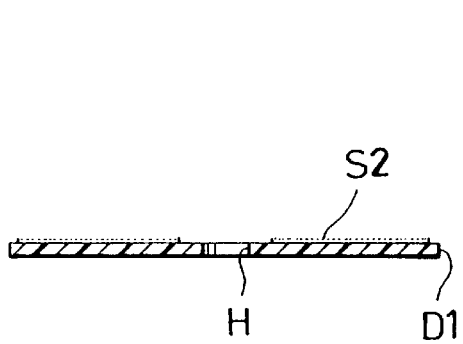
FIG. 9(A) is a side view of a lower disc-shaped substrate to which an adhesive agent is bonded.
FIG. 9(B) is a plan view thereof.
Figure 9:
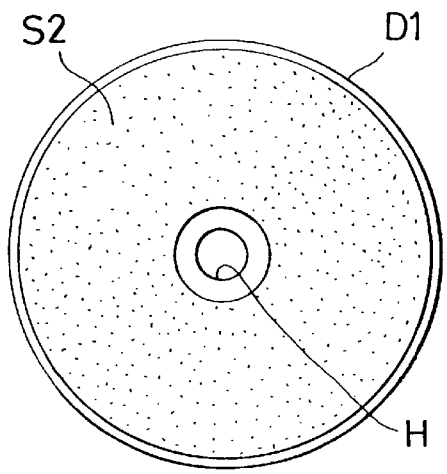

The bonding operation of the adhesive agent S2 relative to the lower disc-shaped substrate D1 is now complete so that the adhesive agent S2 is uniformly bonded to the lower disc-shaped substrate D1 as shown in FIG. 9.

Next, the holding table 2 on which the lower disc-shaped substrate D1 is placed by the movement of a table T is transferred from a first station X which serves as a station for bonding the adhesive agent S2 to the lower disc-shaped substrate D1 as explained above to a next station (second station Y) (See FIG. 13).

An upper disc-shaped substrate D2 is overlaid on the lower disc-shaped substrate D1 to which the adhesive agent S2 is bonded in the second station Y.

Figure 16:
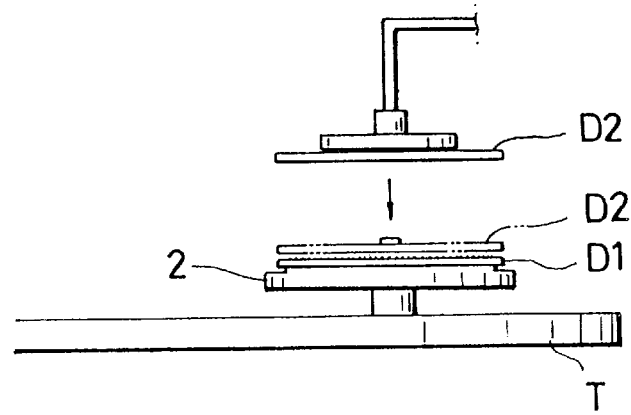
FIG. 16 is a view showing a manner for placing another lower disc-shaped substrate on an upper disc-shaped substrate which is placed on a holding table.

FIG. 16 illustrates a method of placing the upper disc-shaped substrate D2 which is taken out from the outside on the lower disc-shaped substrate D1 on the holding table 2 using a carrying chuck (a suction chuck is preferable here). Thereafter, when the carrying chuck lowers, the upper disc-shaped substrate D2 depicted in dotted lines in FIG. 16 is placed on the lower disc-shaped substrate D1. Since the lower disc-shaped substrate D1 and upper disc-shaped substrate D2 which are overlaid one on the other do not receive a pressing function or force, they are not held in a state where they are bonded to each other completely. Subsequently, the holding table 2 on which the lower disc-shaped substrate D1 and upper disc-shaped substrate D2 are placed is transferred to another station (third station Z) when the table T is further moved (See FIG. 13). In the third station Z, the lower disc-shaped substrate D1 and upper disc-shaped substrate D2 are bonded to each other.

Figure 17:
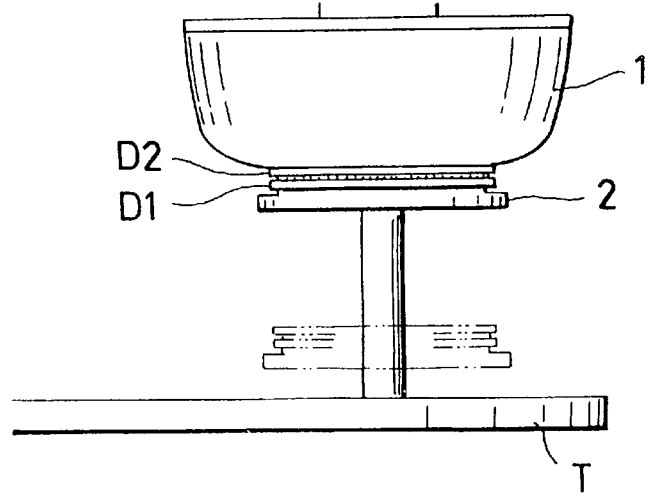
FIG. 17 is a view showing a state where two disc-shaped substrates are placed on the holding table to receive a pressing force.

FIG. 17 shows a state where the holding table 2 moves upward relative to the lower disc-shaped substrate D1 and upper disc-shaped substrate D2 which are placed on the holding table 2 so that the lower disc-shaped substrate D1 and the upper disc-shaped substrate D2 are brought into contact with each other under pressure. The pressing body 1 used here has no projecting core 1A which is different from in the case of the first station X. When the lower disc-shaped substrate D1 and upper disc-shaped substrate D2 placed on the holding table 2 receive the pressing force between the pressing body 1 and holding table 2, they are strongly bonded to each other. The pressing body 1 presses the holding table 2 so that the contact portion therebetween increases gradually from the central portion to the outer portion (radially).

Figure 18:
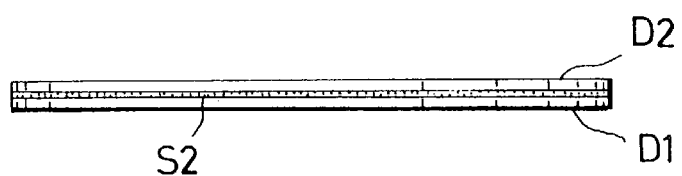
FIG. 18 is a view showing a storage disc formed by laminating the two upper disc-shaped substrates.

Accordingly, the upper disc-shaped substrate D2 is pressed so that the contact portion (pressing portion) relative to the lower disc-shaped substrate D1 increases gradually from the central portion to the outer portion (radially). As a result, air bubbles, etc. are not contained between the lower disc-shaped substrate D1 and upper disc-shaped substrate D2, and hence a uniform storage disc having with no wrinklings therein is formed. The lower disc-shaped substrate D1 and upper disc-shaped substrate D2 are completely bonded to each other, thereby forming a high quality storage disc (See FIG. 18).

FIG. 19 shows a block diagram of the laminating steps 1 to 7 of a lower disc-shaped substrate and upper disc-shaped substrate.

Although the present invention has been described with reference to the preferred embodiment, it is not limited to this embodiment but can be modified variously without departing from the spirit of the claim.

Concrete means used to carry out the method of laminating disc-shaped substrates is not limited to those in the preferred embodiment as illustrated in the accompanying drawings.

For example, the construction of the holding table used in the present invention may be of any type capable of accurately placing the disc-shaped substrates and of fixedly holding them.

The pressing body may be of any type capable of pressing the adhesive sheet body gradually from the central portion to the outer portion of the adhesive sheet body (radially).

The pressing of the adhesive sheet body in the first station X or the pressing of the two disc-shaped substrates in the third station Z can be performed by pressing the pressing body relative to the holding table, namely, the relative pressing force may be applied between the holding table and the pressing body.

Further the peeling means may be of any type capable of stretching by holding thereof in addition to the peeling roller.

With the arrangement of the method of laminating the disc-shaped substrates according to the present invention, the adhesive agent separated from the adhesive sheet body can be uniformly bonded to the surface of the lower disc-shaped substrate without containing air bubbles, etc. and also without generating wrinkling therebetween which is different from the conventional method using UV cured resin, the developing step of the adhesive agent and the irradiating step of UV are respectively dispensed with, thereby reducing the manufacturing steps of the storage disc.

When the storage disc is completed by merely changing the thickness of the adhesive agent bonded to the adhesive sheet body, the thickness of the intermediate layer (adhesive agent layer) between the lower disc-shaped substrate and upper disc-shaped substrate can be easily changed. It is possible to automate the application of adhesive agent on one of disc-shaped substrates, thereby enabling the very effective sequential laminating steps.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A method of laminating disc-shaped substrates comprising the sequential steps of:
   (1) preparing an adhesive sheet body comprising a carrier with plural areas of adhesive agent bonded thereto and covered with a release paper;
   (2) peeling off the release paper from the adhesive agent;
   (3) positioning the adhesive agent of the adhesive sheet body over a lower disc-shaped substrate by inserting a projecting core of a pressing body into a hole of the adhesive sheet body;
   (4) pressing the adhesive sheet body against the lower disc-shaped substrate to bond the adhesive agent to the lower disc-shaped substrate;
   (5) peeling off the carrier from the adhesive agent bonded to the lower disc-shaped substrate in a state wherein the carrier is relaxed, and immediately thereafter tensioning the carrier to prevent contact between the carrier and the adhesive agent;
   (6) placing an upper disc-shaped substrate on the lower disc-shaped substrate; and
   (7) pressing the upper disc-shaped substrate against the lower disc-shaped substrate to integrally laminate the disc-shaped substrates.

2. The method of laminating disc-shaped substrates according to claim 1, further including a step of collecting the release paper.

3. The method of laminating disc-shaped substrates according to claim 2, wherein the step of collecting the release paper is performed using an adhesive tape having an adhesion force relative to the release paper which is greater than the adhesion force of the adhesive agent relative to the release paper.

4. The method of laminating disc-shaped substrates according to claim 1, wherein the step (4) comprises pressing the adhesive sheet body against the lower disc-shaped substrate from a central portion to an outer portion thereof to enlarge a contact portion so as to bond the adhesive agent to the lower disc-shaped substrate.

5. The method of laminating disc-shaped substrates according to claim 1, wherein the step (5) comprises peeling off the carrier from the adhesive agent by a peeling member which traverses between the adhesive sheet body and the lower disc-shaped substrate placed on the holding table at a position remote from the lower disc-shaped substrate and at predetermined intervals.

6. The method of laminating disc-shaped substrates according to claim 1, wherein the step (7) comprises pressing the upper disc-shaped substrate against the lower disc-shaped substrate from a central portion to an outer portion thereof to enlarge a contact portion of the upper disc-shaped substrate relative to the lower disc-shaped substrate so as to bond the upper disc-shaped substrate to the lower disc-shaped substrate.

7. A method of laminating two disc-shaped substrates, said method including the sequential steps of:
- (1) providing a carrier sheet including a plurality of spaced-apart areas containing adhesive agent bonded thereto and a hole extending therethrough at each said area containing adhesive agent;
- (2) sequentially advancing the carrier sheet and aligning one of the areas containing adhesive agent relative to a first disc-shaped substrate by inserting a projecting member of a pressing body into the respective hole in the carrier sheet;
- (3) pressing the carrier sheet against a surface of the first disc-shaped substrate to bond the adhesive agent thereto;
- (4) placing the carrier sheet in a relaxed state and removing same from the adhesive agent bonded to the first disc-shaped substrate;
- (5) immediately thereafter tensioning the carrier sheet to prevent contact between the carrier sheet and the adhesive agent bonded to the first disc-shaped substrate;
- (6) placing a second disc-shaped substrate on the surface of the first disc-shaped substrate; and
- (7) applying pressure to the first and second disc-shaped substrates to bond same to one another.

8. The method according to claim 7 wherein said step (3) comprises pressing the carrier sheet against the first disc-shaped substrate in a progressively radially outward manner from an inner central area thereof to an outer peripheral area thereof to prevent air bubbles from entering between the adhesive agent and the first disc-shaped substrate and to prevent wrinkling of the adhesive agent.

9. The method according to claim 7 wherein said step (1) comprises providing said adhesive agent with a ring-like shape and disposing said adhesive agent in a generally concentric manner about the respective said hole, said ring-like shape conforming to the shape of said surface of the first disc-shaped substrate.

* * * * *